US006280034B1

(12) United States Patent
Brennesholtz

(10) Patent No.: US 6,280,034 B1
(45) Date of Patent: Aug. 28, 2001

(54) EFFICIENT TWO-PANEL PROJECTION SYSTEM EMPLOYING COMPLEMENTARY ILLUMINATION

(75) Inventor: Matthew S. Brennesholtz, Pleasantville, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/365,210

(22) Filed: Jul. 30, 1999

(51) Int. Cl.[7] .................................................. G03B 21/00
(52) U.S. Cl. .............................. 353/20; 353/31; 353/84; 348/742
(58) Field of Search ................................. 353/20, 31, 33, 353/34, 37, 84; 349/9, 8, 7, 5, 18, 97, 106, 115, 117; 359/490, 501, 502, 634; 348/742, 743

(56) References Cited

U.S. PATENT DOCUMENTS

| | | | |
|---|---|---|---|
| 5,111,315 | * | 5/1992 | Ledebuhr ............................ 353/20 |
| 5,374,968 | * | 12/1994 | Haven et al. ....................... 353/31 |
| 5,517,340 | * | 5/1996 | Doany et al. ....................... 359/41 |
| 5,534,949 | * | 7/1996 | Baron ................................. 348/742 |
| 5,552,840 | * | 9/1996 | Ishii et al. .......................... 348/742 |
| 5,751,384 | * | 5/1998 | Sharp ................................. 349/18 |
| 5,816,675 | * | 10/1998 | Brice et al. ......................... 353/31 |
| 5,863,125 | * | 1/1999 | Doany ................................ 353/84 |
| 5,921,650 | * | 7/1999 | Doany et al. ....................... 353/31 |
| 5,929,946 | * | 7/1999 | Sharp et al. ........................ 349/18 |
| 6,000,802 | * | 12/1999 | Hashizume et al. ................ 353/20 |
| 6,086,208 | * | 7/2000 | Glenn ................................. 353/31 |
| 6,113,239 | * | 9/2000 | Sampsell et al. ................... 353/31 |
| 6,183,091 | * | 2/2001 | Johnson et al. .................... 353/20 |

* cited by examiner

Primary Examiner—William Dowling

(57) ABSTRACT

An imaging system, comprising a broadband unpolarized white light source (81), a polarization converter system for converting polarization axes of unpolarized white light into a substantially single polarization axis, to produce a beam of polarized light, a selective polarization filter (82), adapted to selectively rotate a polarization axis of a selected spectral band of light of the with respect to remaining polarized light based on a control signal (119), a polarized beam splitter (84), for separating light having a the substantially single polarization axis from light having a rotated polarization axis, a pair of electro-optic spatial light modulators (86, 89), disposed along a path of light within the spectral band and a path of remaining light outside the spectral band, respectively, and being adapted to modulate an image therein, and a polarized beam splitter (88), for recombining modulated light from the pair of light modulators. In a preferred embodiment, the selective polarization filter (82, 72) is divided into a plurality of regions (70, 71), each adapted to independently and selectively rotate a polarization axis of a selected spectral band of light of the with respect to remaining polarized light.

17 Claims, 7 Drawing Sheets

EFFICIENT TWO-PANEL PROJECTION SYSTEM EMPLOYING COMPLEMENTARY ILLUMINATION

FIELD OF THE INVENTION

The present invention relates to an image projection system, providing efficient use of illumination, and more particularly to such a system employing a primary color imaging panel and a complementary color luminance augmentation panel.

BACKGROUND OF THE INVENTION

Image projection systems such as light valve projection systems use one or more small flat panel electro-optic display devices to generate an image by modulating a light beam generated by a lamp This image is then magnified and projected on a screen for viewing.

Typically, the flat panel display device is an active matrix liquid crystal display (AMLCD) device, having, for example, a resolution of 1280 by 1024 pixels. Since the image is projected, the display device may be relatively small, e.g., less than about 6 cm. Further, the preferred mode of operation is a reflective mode, which allows use of thinner layers of liquid crystal light modulation material and correspondingly faster response times, since the light passes through the liquid crystal twice.

In conventional projectors using white light illumination, the light is split or filtered into three primary color components, red, green and blue, representing "corner" of a color triangle defining a color gamut on the CIE 1931 color chart, so that a complete rendering of the colors within the triangle can be achieved. These three components are separately modulated.

Known LCD projection systems provide one or more LCD panels, up to, for example, six panels, to modulate the spatial and color aspects of an image. Thus, in a single LCD panel display, the LCD is time or space division multiplexed with the respective colors. In a time-multiplexed system, red, green and blue polarized light is sequentially projected onto the panel, spatially modulated, analyzed (by, e.g., a second polarizer) and then projected, with the human eye merging the colors. In a spatially multiplexed system, a tri-color masked LCD panel is illuminated with white polarized light, with the modulated light passing through an analyzer (a second polarizer) and then projected. These single panel systems are known to be inefficient. For example, in a time or space domain multiplexed system, the peak brightness is much less than one-third of the brightness of the polarized white light source, for example utilizing as little as only 1% of the light output for typical images.

Image projection systems of high illumination efficiency allow the use of smaller projection lamps, smaller power supplies, reduced air flow cooling (resulting in reduced noise), greater portability, battery operation, and other advantages. In addition, the availability of higher power lamps may be limited, and thus higher efficiency may result in more available light sources.

In order to provide improved light use efficiency, four-color (red, green, blue, white) techniques were developed, in which the white light increases luminance by introducing white light into the image in proportion to the luminance signal. The amount of white light that may be acceptably added to the red, green, and blue light at an image point is a function of both the color and the luminance of that point. While there are many different algorithms to determine the amount of white to add, they share many common features. For saturated colors, very little white may be added to the red, green, blue. For desaturated colors, increasing amounts of white may be added.

The final luminance is $L_R+L_G+L_B+L_W$. Viewing tests have shown that if $L_W$ is greater than about 40–50% of $L_R+L_G+L_B$, the colors are unacceptably desaturated and the primaries are unacceptably dim. This limits the overall gain in lumens possible with this technique.

It is also known to use colors other than red, green, blue for forming an image in a projection system. Alternatives include four or more spectral bands, and a six color system including red, green, blue, magenta, cyan and yellow. See, JP 09-230301 and U.S. patent application Ser. No. 08/579, 655, expressly incorporated herein by reference.

OBJECTS AND SUMMARY OF THE INVENTION

It is therefore an object of one embodiment of the invention to provide an imaging system, having a broadband light source, a selective beamsplitter, adapted to selectively spatially separate light within a controllably selected spectral band from light outside said controllably selected spectral band, and a pair of light modulators, each being respectively disposed along a path of light within said controllably selected spectral band from said light outside said controllably selected spectral band.

It is also an object of one embodiment of the invention to provide an imaging method, comprising the steps of: providing a broadband light source; splitting the output of the broadband light source, to selectively spatially separate light within a controllably selected spectral band from light outside the controllably selected spectral band; and separately spatially modulating light disposed along a path of light within the controllably selected spectral band and light outside the controllably selected spectral band.

It is a still further object of one embodiment of the invention to provide an imaging system, comprising a broadband unpolarized white light source; a polarization converter system for converting polarization axes of unpolarized white light into a substantially single polarization axis, to produce a beam of polarized light; a selective polarization filter, adapted to selectively rotate a polarization axis of a selected spectral band of light of the with respect to remaining polarized light based on a control signal; a polarized beam splitter, for separating light having a the substantially single polarization axis from light having a rotated polarization axis; a set of electro-optic spatial light modulators, disposed along a path of light within said spectral band and a path of remaining light outside said spectral band, respectively, and being adapted to modulate an image therein; and a polarized beam splitter, for recombining modulated light from the set of light modulators.

The light modulator disposed along a path of light within the controllably selected spectral band preferably modulates red, green and blue light while the light modulator disposed along a path of light outside the controllably selected spectral band preferably modulates cyan, magenta and yellow light.

The splitting step may be controlled electrically or mechanically to rotate a polarization axis of a selected color band, and may also be presented in a dynamic scrolling pattern.

The present invention provides a system which seeks to efficiently use substantially all of the light output of a projector illumination source by splitting the light into two components based on color, and separately modulating each split color component. In order to achieve full color range, the wavelength characteristics of the color splitter are varied in time sequential manner, to provide increased coverage of the full color gamut.

In a preferred design, white light is sequentially split into three different primary color components from a respective complementary color component. In practice, the primary color components are available for RGB color space imaging, while the complementary color components, CMY, are simultaneously available for white level augmentation. This results in efficient use of the illumination. It is noted that, in certain applications where complete coverage of the RGB color gamut is not required, the color split may be static, e.g., representing a respective color and its complement, neither of which need represent a primary color.

The present invention allows substantially all of the light output of a projector illumination source by modulating a primary color image signal using illumination within first color space and modulating a luminance augmentation signal using complementary illumination within a second, complementary color space. Therefore, the illumination at any pixel is the sum of the luminance and complementary luminance, thereby permitting use of substantially all of the available light.

In a preferred embodiment, at any given time and for any given pixel, polarized white light is split between a spectral band projected on a first imaging panel, representing a primary color (red, green, or blue), and a remainder of the light (representing a respective complementary color, magenta, cyan or yellow) projected on a second imaging panel. The modulated light from the second imaging panel is merged with the modulated light from the first panel to selectively augment the luminance without degrading the potential brightness of the output of the first panel, or unacceptably reducing color saturation.

Since the respective complementary colors are closer to primary colors than white light, a greater proportion of the respective complementary colors may be added before unacceptable desaturation occurs. It has been found, for example, that the maximum acceptable luminance augmentation is about 243%, a substantial improvement over a four color system, in which the maximum acceptable luminance augmentation is 140–150%. Since, at any time, all of the light is available for imaging, and typically, real images allow an appreciable amount of the complementary light to be employed, the system results in efficient light utilization.

In a preferred embodiment, the light is split between the two panels as follows. Output of an unpolarized white light source is converted, in known manner, to a vertically polarized beam, for example using a polarized wave converter as discussed above. A controllable optical retarder is provided in the path of the polarized light that selectively converts the various optical bands of the light to horizontal polarization. The retarder may be mechanically or electrically altered, to provide cycles of retardation of the various primary colors. It is noted that the entire area of the panel may be uniformly illuminated, or portions may be differentially illuminated. For example, a scroll function may be implemented in a horizontally zoned electrically altered selective retarder by sequentially operating the zones to shift a polarization of particular light bands. Likewise, in a mechanically varied system, selective retarders may be mechanically displaced in the optic path which modify a portion of the light beam.

When light modified by the selective retarder passes through a MacNeille type polarized beam splitter (PBS), the p-polarized light passes unaltered, while the s-polarized light is reflected. Thus, two complementary optical paths are formed, for the primary and respective complementary colors. After spatial light modulation by the panels, the optical outputs are recombined through a polarized beamsplitter, and projected. It is generally not necessary to rotate the polarization of the light from the complementary color light path, although appropriate optics may be provided for this purpose. Thus, for any pixel location, the primary color and complementary color outputs are available. This arrangement allows efficient use of light while incurring limited light losses in the optical path.

Known algorithms are employed to define, from an image signal, the appropriate distribution of the six colors, red, green, blue, magenta, cyan, yellow, which are used as drive signals to the two panels.

While the present invention may be used with many different types of spatial light modulators, particular advantages are apparent with liquid crystal display devices (or other optical retardation based spatial light modulators), since the polarization of the incident light is necessary for both portions of the system to operate, and therefore does not impose an additional inefficiency.

These and other objects and features of the present invention will become more fully apparent from the following description and appended claims taken in conjunction with the accompanying drawings.

BRIEF DESCRIPTION OF THE DRAWINGS

For a better understanding of the invention, reference is made to the drawings, which are to be taken in conjunction with the detailed specification to follow.

DETAILED DESCRIPTION OF THE PREFERRED EMBODIMENT

Figure 1:
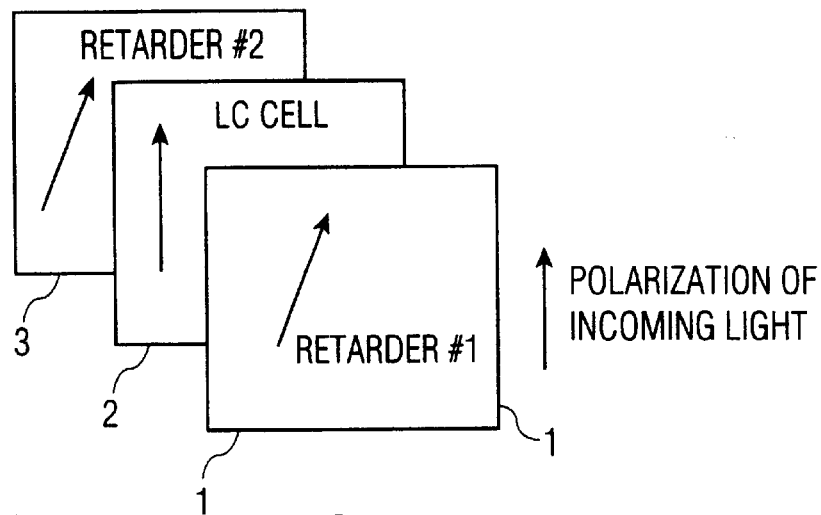
FIG. 1 is schematic view showing operation of an electronically controlled selectively polarizing filter.

The invention will now be described by way of the drawings, in which corresponding reference numerals indicate corresponding structures in the figures.

SELECTIVE POLARIZATION FILTERS

Selective polarization filters (SPF) are available which selectively rotate a polarization axis of a specific color band of light, while leaving the remaining bands unchanged. One or more SPFs can be combined with an LCD or other electro-optic element to produce an electronically controlled selective polarization filter (E-SPF). A device of this type is also sometimes called a polarizing color shutter, or more informally, shutter. In an E-SPF the polarization of a given band of light is rotated, based on an electrical signal. While such E-SPFs may be constructed with absorptive selective polarizers, devices are also known which employ non-absorbing stack of retarders. The number of retarders in the stack and the retardances and orientations of the retarders are selected such that an additive primary spectrum is transmitted along a first polarization axis and the complementary subtractive primary spectrum is transmitted along the orthogonal polarization axis.

SPFs and E-SPFs can also be based on cholesteric materials and circularly polarized light. See, for example, Broer et al., U.S. Pat. No. 5,042,925, expressly incorporated herein by reference; A. Sadchikhin, et. al. "AM LCLV Projector with Cholesteric Mirrors as Color Separation Elements", Conference Record of the 1997 International Display Research Conference, Society for Information Display, Santa Ana, Calif. 1997.

The E-SPF is intrinsically binary tunable, such that each filter stage permits switching between two colors. These devices are thin and may be stacked. A stack of 3 E-SPF devices allows control over the polarization of three separate wavelength bands, e.g. red, green and blue. These devices are typically non-absorptive: all the light that enters the device exits the device, with or without a polarization change that depends on the externally applied voltages on the stack of three devices. The device responds to analog control and therefore intermediate states between horizontal and vertical can be achieved. These retardance based E-SPF devices are available commercially from ColorLink Inc. See, Sharp, U.S. Pat. Nos. 5,751,384, and WO 97/43862, expressly incorporated herein by reference.

For example, assume an E-SPF device is designed to work with green light and horizontally polarized white light is put into the device. When the device is not activated, horizontally polarized white light comes out of the device. When the device is activated, it will rotate the polarization of the green light 90°. Therefore, red and blue light coming out of the device will remain horizontally polarized while the green light will be vertically polarized.

In a preferred electronically controlled selective polarization filter (E-SPF), an optical retardance-based wavelength separation is employed. Further, the E-SPF may be segmented into individually controllable horizontal zones, allowing a sequential scroll and/or random access function to be implemented for each of the red, blue and green light components.

The operation of the preferred E-SPF device is shown in FIG. 1. The incoming light is linearly polarized. The first retarder 1 is designed to have one-half wave of retardance for one color band oriented at 22.5 degrees to the incoming polarization, any retardance for the other color bands being parallel or perpendicular to the incoming polarization. This first retarder 1 rotates the polarization of one color band by 45 degrees and leaves the polarization in the other color bands unchanged. The liquid crystal (LC) cell 2 is designed to have one-half wave of retardance with no voltage applied, and no retardance with full voltage applied. It is oriented parallel or perpendicular to the incoming polarization. The color bands with the original polarization are unchanged by the liquid crystal cell 2, regardless of the applied voltage. The polarization angle of the color band that is at 45 degrees will be rotated 90 degrees (to 135 degrees relative to the input polarization) if the liquid crystal cell 2 has no voltage, or left unchanged if full voltage is applied. If an intermediate voltage is applied, the light is converted into elliptically polarized light, with orthogonal linear components at 45 degrees and 135 degrees. The second Retarder 3 is designed to complement first retarder 1. The color bands not rotated by the first retarder are also not rotated by the second retarder 3. The color band rotated 45 degrees by the first retarder 1 is now rotated 45 degrees in the opposite direction. The polarization of this color band is now either parallel or perpendicular to the incoming light, while the polarization of the other color bands are unchanged.

Figure 2:
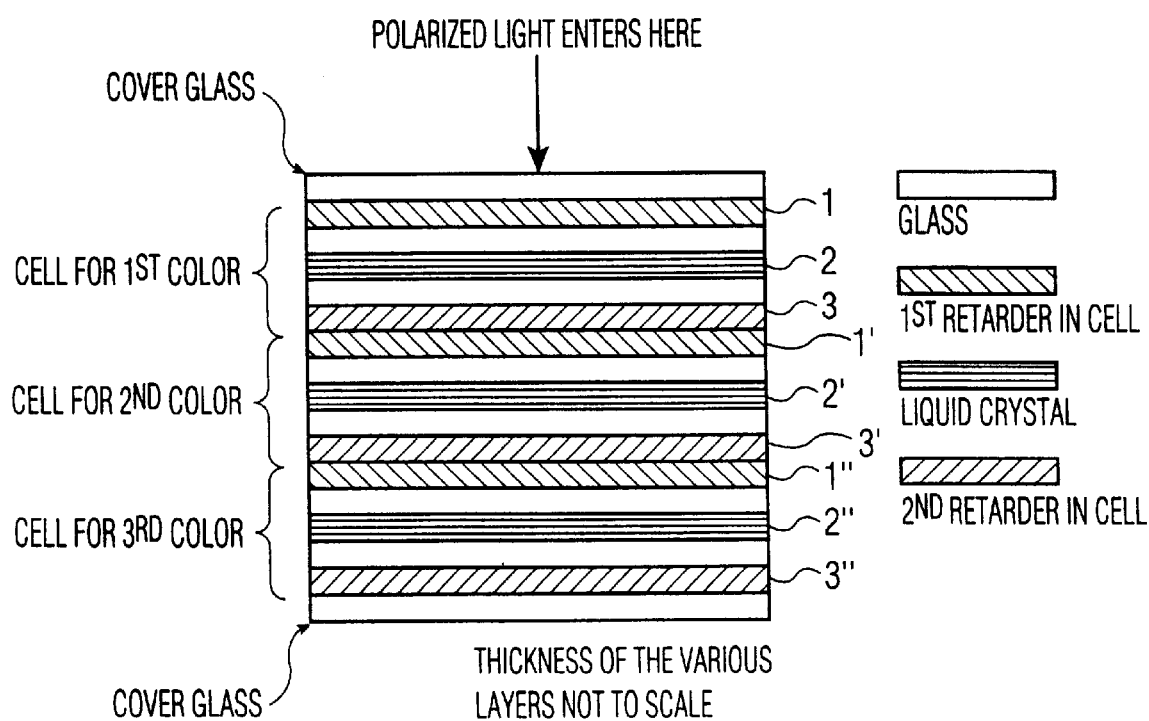
FIG. 2 is a cross sectional view showing the structure of an electronically controlled selectively polarizing filter stack.

A stack of three of these devices can operate independently on the red (first retarder 1, liquid crystal cell 2, second retarder 3), green (first retarder 1', liquid crystal cell 2', second retarder 3') and blue (first retarder 1", liquid crystal cell 2", second retarder 3") color bands. Construction of such a stack is shown in FIG. 2.

The outside dimensions of the preferred device are 1.5" square. This stack is about 0.45" thick. This design includes 8 pieces of glass, each 1.1 mm thick, plus 6 retarder stacks, each composed of between 3 and 7 layers of birefringent material, although reductions in thickness may presumably be obtained by employing thinner glass. It may also be possible to combine the design of the $2^{nd}$ retarder set in one cell with the $1^{st}$ retarder set in the next cell. A drive voltage of about □25 volts, more or less, is used to drive each cell to the non-birefringent state.

Figure 4:
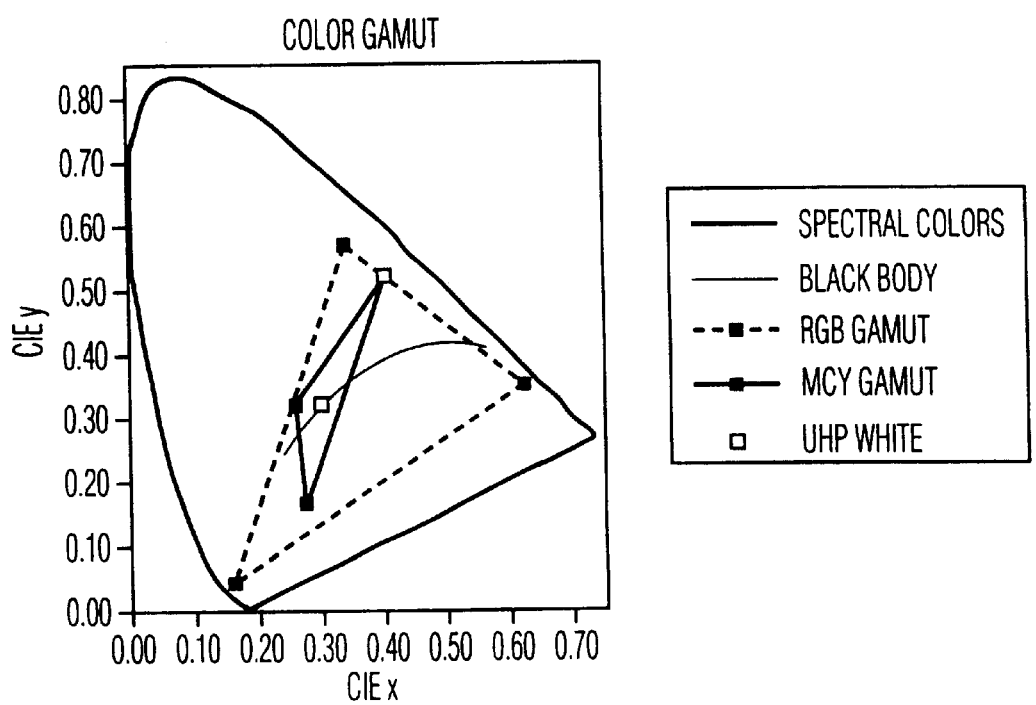
FIG. 4 is a CIE 1931 color gamut plot showing primary and complementary colors available in the system according to the present invention.

The colors produced by the preferred cell and the Philips UHP lamp are plotted on the CIE 1931 diagram in FIG. 4. The primary colors (R, G, B) as measured between crossed polarizers are shown as a triangle with a dotted line while the complementary colors (M,C,Y) (parallel polarizers) are shown as triangle with a solid line. Also shown is the white light from the lamp (W). The black body color curve is shown (BB), with all colors within the spectral colors (SC) outline.

In principle, any color separation that can be done with the electronically controllable SPF device coupled to a polarizing beam splitter could also be done with a dichroic color wheel or a color drum. An E-SPF has the advantages, however, of no moving parts, making a system more compact and more rugged; analog control, allowing selection of intermediate colors or mixtures of colors; and electronic control, without mechanical inertia, allowing synchronization of an E-SPF device to an external signal essentially instantaneously. As compared to a color wheel embodiment, the E-SPF provides the advantages of small size, and no moving parts. According to the present invention, the non-absorptive nature of the E-SPF allows further light efficiency and luminance augmentation as well.

Preferably, the flat panel (or relevant portion thereof) is not illuminated during data refresh. In an unstructured (full field switching) SPF, this means that the light source is "off" during the refresh cycle, which at 60 Hz refresh is 5 mS per field. Thus, if it takes 3.5 mS to refresh the LCD panel, the lamp is off for this period and "on" for the remaining 1.5 mS of the cycle. This arrangement requires a light source capable of operating at relatively low duty cycle.

Figure 6:
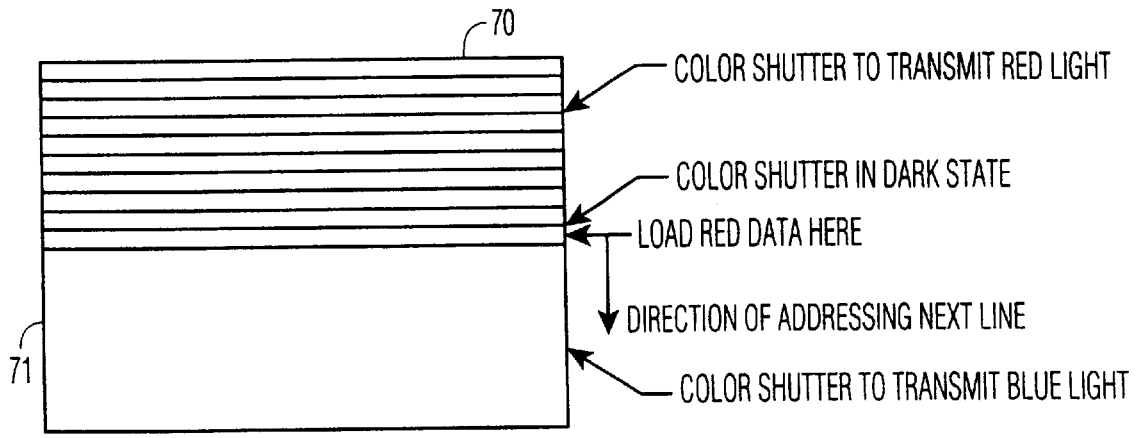
FIG. 6 shows schematically the operation of a segmented electronically controlled selectively polarizing filter according to the present invention.

Another approach to using an E-SPF device is to pattern the shutter into a number of horizontal stripes, as shown in FIG. 6. In FIG. 6, the shutter is shown divided into 20 separate horizontal segments 70, each independently addressable and selectable for a desired state. For a practical projector, the more segments the better, within reason. For example, about 100 segments may be optimal.

In this case, portions of the LCD panels are refreshed with new image data while other portions are displayed. Typically, the refresh scrolls down the LCD panel, with approximately one-third of the LCD displaying each respective color, and a transition 71 between respective colors. The E-SPF, therefore, is controlled to direct the respective desired color to the appropriate portion of the first LCD panel, with the complement of that color, separated by the E-SPF, directed to the second LCD panel for luminance augmentation.

The luminance augmentation method according to the present invention may be implemented using mechanical technologies as well. For example, the selective polarization shift within a particular color band may be accomplished using a narrow band half-wave retarder centered within the color band, in a similar manner to dichroic filter technology. Typically, filter portions are formed on the face of a disk (e.g., in the manner of a color wheel) or the periphery of a cylinder (e.g., in the manner of a color drum). In this case, however, in contrast to known filtering systems, all light is passed, with a selective wavelength-dependent polarization shift.

Figure 7:
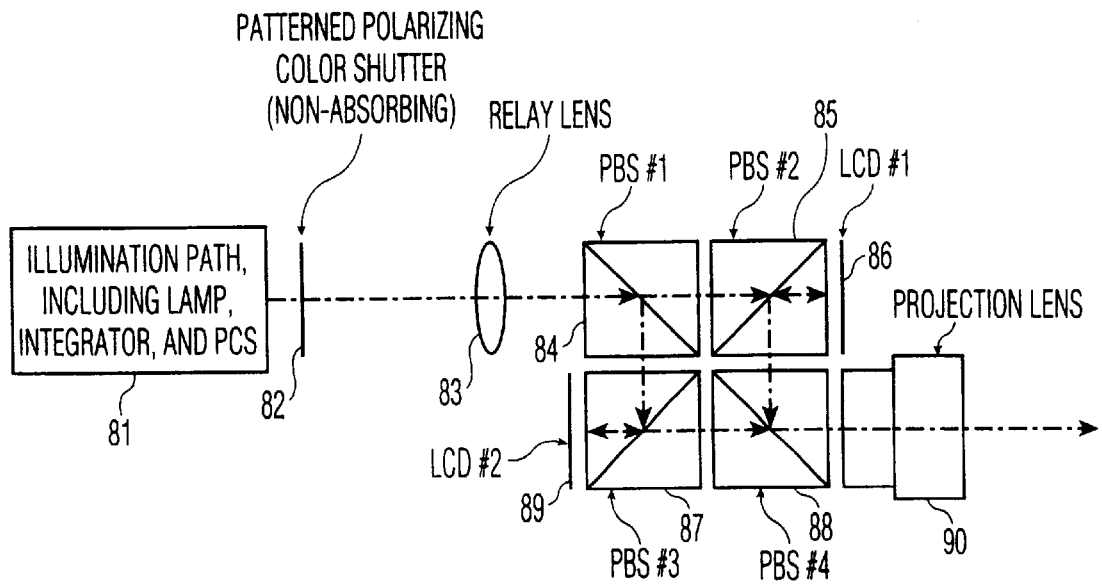
FIG. 7 shows schematically a two panel, six color reflective mode image projection system according to the present invention.

In accordance with the preferred embodiment shown in FIG. 7, the PCS produces light that is s-polarized at the PBS. If the SPF is driven so the polarization of one light band, e.g., green, is rotated 90 degrees, green light will transmit through the first and second PBS (without reflection therein), illuminating the first LCD for spatial light modulation thereof in a desired pixel pattern. The complementary color, i.e., the light whose polarization axis is not shifted by the SPF, e.g., magenta, will reflect off of both the first and third PBS and illuminate the second LCD. The light, modulated as reflection-mode patterns off of the first and second LCDs, are then recombined in the fourth PBS and together projected through a common lens. The fourth PBS also serves as an analyzer for both of the LCD spatial light modulators, and therefore absorptive polarizing filters would normally not be required.

Since the system is operable, from the first LCD, to modulate red, green and blue, and from the second LCD, to modulate magenta, cyan and yellow, the system is considered a six color red, green, blue, magenta, cyan, yellow projection system.

The overall effect of this system is similar to the red, green, blue and white (RGBW) systems currently used for digital micromirror devices (DMD). The advantage of the red, green, blue-cyan, magenta, yellow (RGB-CMY) system over a red, green, blue, white system is two-fold. First, light utilization efficiency is increased. In a red, green, blue, white, color wheel, or known E-SPF single panel system, light efficiency is typically limited to at most 50%, with the remainder lost. Human factors related to color saturation issues limit the actual light utilization to somewhat less than this. In the RGB-CMY system, essentially 100% of the polarized light could be used. The RGB-CMY system has less severe color saturation issues than RGBW systems, because the secondary colors (CMY) do in fact have some color, and so they do not reduce the color saturation as much as white will reduce it. It has therefore been found that, while luminance augmentation in a red, green, blue, white system is limited to 140–150%, acceptable luminance augmentation in an RGB-CMY system may reach 243%.

While it is preferred that the E-SPF be employed in an SLM system which otherwise requires polarized light, the E-SPF may also be employed in systems using other types of SLM, such as the aforementioned DMD from Texas Instruments, in a two panel architecture. It is noted that the prior art polarization converting system, which essentially doubles the light output as compared to a polarizing filter, also doubles the etendue of the incoming light, and would significantly reduce the throughput of an etendue limited DMD system.

Figure 5:
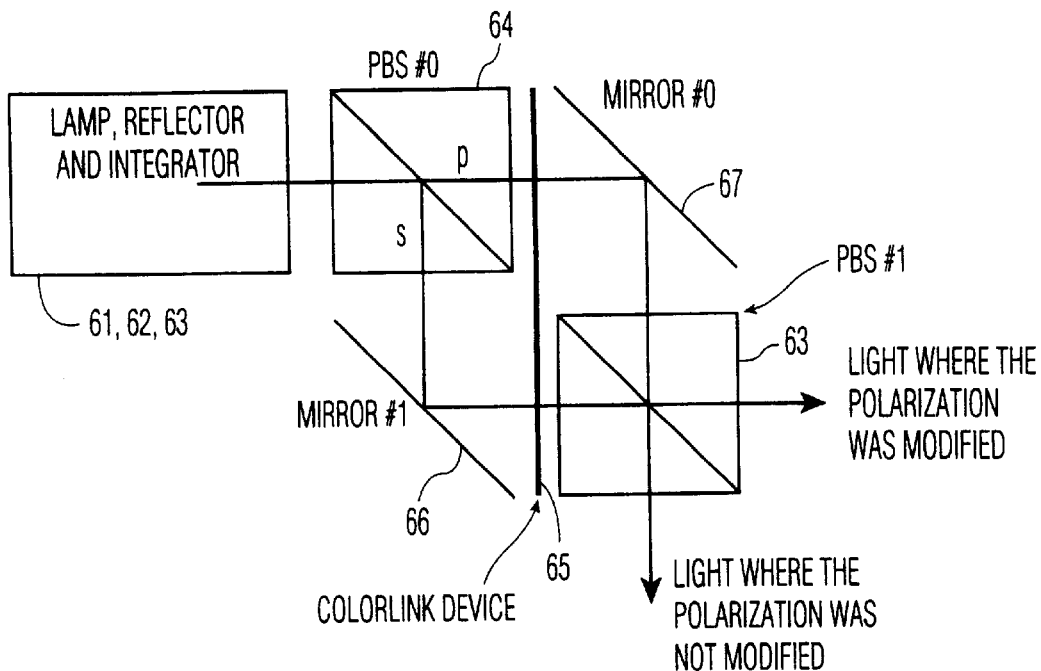
FIG. 5 shows a schematic view of the illumination optics portion of a six color, two spatial light modulator, image projection system according to the present invention where the spatial light modulators do not require polarized light.

FIG. 5 shows a possible approach to the use of unpolarized light with a DMD SLM and an E-SPF, without the etendue penalty associated with prior-art polarization conversion systems. In this system, unpolarized light is generated by the projector lamp 61 and reflector 62, integrated with integrator 63, and then split into s- and p-polarized light by the first PBS 64. These two beams both pass through a single or pair of E-SPF devices 65. In the case of a patterned SPF 65, it is preferred to have two devices in order to get correct imaging of the stripes. Light is redirected by mirrors 66, 67 from the first PBS 64 to the second PBS 68, through the E-SPF 65. In operation, for example, the green channel of the E-SPF 65 is activated (low voltage), so that the polarization of green is rotated 90 degrees but the polarization of red and blue are unchanged (high voltage). The green s-polarized light will now be p-polarized light when it reaches the second PBS 68 and will be transmitted. Green p-polarized light will be s-polarized light when it reaches the second PBS 68 and will be reflected by the second PBS 68. Therefore, both polarizations of green will come out of the system to the right. Both polarizations of blue and red light are unchanged and will come out of the system to the bottom. Polarization insensitive SLMs, including DMD devices (not shown), may be placed in the light path after the second PBS 68. In order to recombine the two beams after the DMDs, a symmetric system is preferred, having a second E-SPF and set of PBSs to recombine the beams (not shown in FIG. 5). Alternatively, the projector could be designed as a two lens projector with recombination happening at the screen.

It is noted that according to a preferred embodiment of the present invention, there are substantial advantages over a red, green, blue, white system, and further, little or nothing would be gained by employing a greater number of complementary color pairs than three. Specifically, there would be no benefit from adding a white/black complementary pair. Since the complementary color of white is black, during the black period one liquid crystal display device is unused. Using three complementary pairs, i.e. red/cyan, green/magenta, and blue/yellow provides all the lumen throughput benefits of a red, green, blue, white system while avoiding most of the color saturation problems associated with a prior art red , green, blue, white system.

EXAMPLE 1

FIG. 7 shows an embodiment according to the present invention. This embodiment provides an illumination path, a non-absorbing polarizing color shutter (electronically controlled selective polarization filter or E-SPF), such as available from ColorLink and described above, 4 polarizing beam splitters (PBSs), two reflective LCDs and a projection lens. FIG. 7 shows the 4 PBSs as 4 separate units. It is noted that, if intervening components, (i.e. field or relay lenses) are not required between the separate PBSs, then these elements can be merged into a single large X-prism with polarizing coatings on both diagonals.

In FIG. 7, the illumination source 81 provides polarized white light illumination for the LCD panels 86, 89, with the integrator designed to form the light body on each LCD 86, 89. Note that this is an equal illumination path system, so the light body is formed on both LCDs 86, 89 simultaneously. It is assumed for discussion purposes that the illumination path produces p-polarized light and the PBS elements transmit p-polarized light and reflects s-polarized light. When the E-SPF 82 is de-activated and does not change the polarization of any color light, substantially all light will pass through both the first PBS 84 and the second PBS 85, and illuminate the first LCD 86. The first LCD 86 is operative to modulate the pixel light pattern over its surface by rotating the polarization of the light 90° where the image should be bright and leaving the polarization unchanged where the image should be dark. Light for which the polarization was changed will now be s-polarized for its second encounter with the second PBS 85, and will be reflected thereby. It will also be reflected off the fourth PBS 88, enter the projection lens 90, and ultimately reach the projection screen (not shown). In this mode, the system is acting as a monochrome reflective LCD system.

If the polarizing color shutter 82 rotates the polarization of one color, for example green, by 90°, then green light will be s-polarized relative to the coating on first PBS 84 and will be reflected. Red and blue light will still be p-polarized and will be transmitted. The green light will also be reflected at the third PBS 87 and will illuminate the second LCD 89. This second LCD 89 can then selectively modulate the polarization of the green light and create a green image. This green modulated light will be p-polarized relative to the third PBS 87 and will transmit through the third PBS 87 and the fourth PBS 88. The green light will enter the projection lens 90 and produce a green image at the screen (not shown). In the same manner described for white light, the red and blue light will pass through the first and second PBS 84, 85, be modulated by the first LCD 86, will then reflect off the second and fourth PBS 85, 88, enter the projection lens 90 and form a magenta image at the screen that is registered with the green image. A two-color projector with green and magenta primary colors is provided.

Correspondingly, if the polarizing color shutter 82 rotates the red light polarization by 90° without changing the blue or green light, the system acts as the 2 color projector with red and cyan as the primary colors. Finally, if the polarizing color shutter 82 rotates the polarization of the blue light while leaving red and green unchanged, the projector acts as a two color projector with blue and yellow as the primary colors. If the polarizing color shutter 82 cycles through the three states (red, green and blue) in one field time of the video signal (e.g. 1/60 second for NTSC), the projector will act as a color sequential projector with 6 primary colors.

Figure 3:
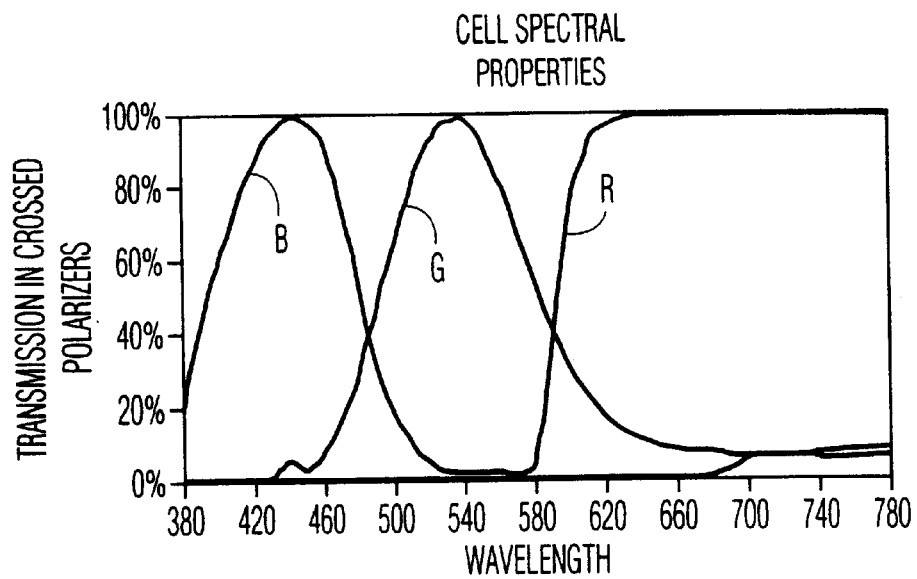
FIG. 3 is a graph of selectively polarizing filter stack spectral properties.

If a cell whose spectral properties match the properties shown in FIG. 3 is used with the UHP lamp in the system shown in FIG. 7, and all components in the system are neutral density except for the color shutter, the system will produce the 6 color primaries (RGB-CMY) shown in FIG. 3. The spectral properties shown in FIG. 3 were chosen as arbitrary red, green and blue transmission spectra and do not necessarily correspond to the properties of the preferred ColorLink E-SPF.

The red-green-blue (RGB) portion of the color gamut of FIG. 4 is indicated by the outer triangle with dashed lines. This is the gamut that would be produced by a prior art color sequential projector with RGB primaries. The open black square (W) is the color point of the UHP lamp. With the prior art 4-color system, white light of this color can be added to the red, green and blue light to enhance the system brightness. Because the white light represents only a single color, the projector designer is severely constrained in how much light he may add, and the algorithm he may use to determine how to add that white light to desaturated colors.

The smaller triangle with solid lines (CMY) represents the color gamut of the projector, taking into account only the cyan, magenta and yellow primaries. Any color inside both triangles can be produced by either the RGB portion of the projector or the CMY portion of the projector. Therefore, any color inside both gamuts can be augmented by the full amount of CMY without distorting the color. Since the CMY portion of the projector (in this example) is 143% as bright as the RGB portion of the projector, it should be appreciated that the augmentation limit is significantly higher for the RGB-CMY projector than the 40–50% white addition limit possible with the RGBW prior art projector.

The exact size and shape of the CMY color gamut is determined by the properties of the E-SPF 82 and the spectral energy distribution of the lamp 81. Due to the relatively low output of the preferred UHP lamp in the red, as compared to blue and green, the MCY gamut in FIG. 4 is biased away from the red primary. Depending on the color properties of the E-SPF 82, it is possible for the cyan, magenta and yellow color points to be outside the RGB color gamut. In this case, not only is the white brightness enhanced but the color gamut achievable by the projector is actually expanded. In the example, the yellow primary is actually slightly outside the border of the gamut defined by the red and green primaries. Therefore, the example projector would have a slightly expanded yellow color gamut.

EXAMPLE 2

One variation in the color sequencing occurs if one LCD, for example the first LCD 86, is assigned to produce the green, cyan (green+blue) and yellow (green+red) fields, while the other LCD 89 is assigned the red, blue and magenta (red+blue) fields. With this arrangement, the green light never needs to go to the second LCD 89. Therefore, the polarization of the green light in the incoming white light is never modified by the E-SPF, and further, the E-SPF need only be a 2 layer device capable of modifying the polarization of red and blue light rather than a three layer device capable of modifying the polarization of all three colors. Of course, it is obvious that modulation of the polarization of any pair of colors is sufficient to produce a 6 primary color projector: red/blue as in the example, or red/green or blue/green.

It is further noted that, instead of providing a two-layer E-SPF with red and blue modulation, the E-SPF 82 may provide blue and green modulation, thereby assigning the first LCD 86 red, yellow (red+green) and magenta (red+blue), with the second LCD 89 being assigned blue, green and cyan (green+blue). This arrangement provides the advantage that the SPF 82 may omit the potentially troublesome red layer, while the remaining system components, especially the first and second LCD 86, 89 SLMs and PBSs

84, 85, 87, 88, may be optimized for the particular wavelengths or spectral bands to be modulated and/or analyzed, respectively.

EXAMPLE 3

In the embodiments described above, the E-SFP 82 is presumed to act in concert with global addressing, i.e., the entire area of each LCD and the color shutter change state simultaneously. See, Shields, U.S. Pat. No. 4,870,396, expressly incorporated herein by reference.

This is not the most common manner of addressing LCDs, however. In the typical LCD (reflective or transmissive) the data is loaded into one row at a time and the state of the LCD changes immediately after the data is loaded. Take, for example, the case of a single panel color sequential system where the data is loaded in the order red, green, blue. While the red data is loading into a row, it is overwriting the blue data in that line from the previous field. As soon as a row is finished loading, the addressing circuitry drops down to the next row and loads the red data for that row, overwriting the previous blue data. Therefore, there is a line traveling down the LCD with blue data below the line and red data above the line. When this line reaches the bottom of the LCD, it jumps to the top of the LCD and starts to write green data to overwrite the red data. In order to accommodate this addressing scheme, it is necessary to have the illumination on a pixel match the data on that pixel. Therefore, where there is blue data on the LCD, there must be blue light illuminating the LCD. Where there is red data, there must be red light. In this arrangement, the boundary between blue and red light must be a horizontal line and move down the panel at the same rate as the data being loaded into the panel. One scheme to accomplish this is the scrolling color system. See, Janssen et al., U.S. Pat. No. 5,532,763, expressly incorporated herein by reference.

To accommodate a conventional LCD of this type, it is necessary to pattern the E-SFP into horizontal segments, as shown in FIG. 6. In FIG. 6, the E-SPF is divided into 20 separate horizontal segments 70, each independently addressable. For a practical projector, the more segments the better, within reason, for example 100 segments.

The E-SPF 72 is imaged on to the first and second LCDs 86, 89 with a relay lens 83, as shown in FIG. 7.

Since there are a relatively small number of segments (about 100) compared to the number of rows of pixels in the LCD (1024 for SXGA). It is impossible to have the boundary of the light exactly match the boundary of the data. In a conventional single panel system, it would be possible to have the segment of the shutter that is illuminating the current row driven to black. According to this embodiment of the present invention, this would not work because the two LCDs 86, 89 are being addressed simultaneously with data. Thus, if the first LCD 86 is showing RGB, when the shutter is driven to black, the complimentary color, i.e. white, would appear at the second LCD 89. However, with 100 or more segments, this problem would likely be small enough to not have a significant effect on display colorimetry. If, however, this is a problem, it would be possible to drive an entire small section of the second LCD 89 to black during the transition period.

EXAMPLE 4

Figure 8:
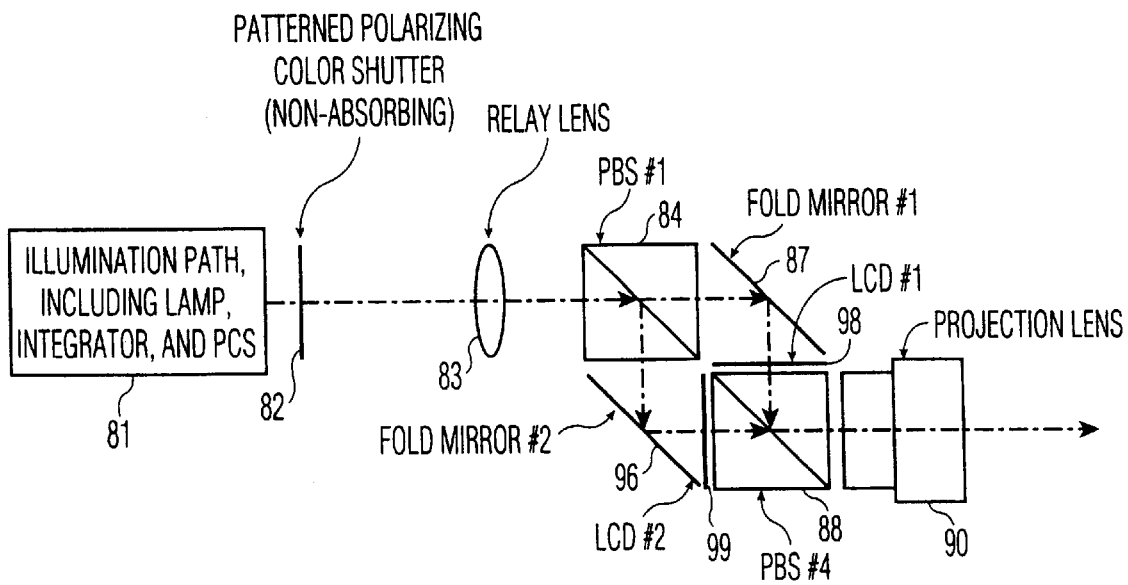
FIG. 8 shows schematically a two panel, six color transmissive mode image projection system according to the present invention.

The present projection system would also work for transmissive LCDs, as shown in FIG. 8. In this case, two plane fold mirrors 97, 98 replace the second and third PBS 85, 87 of FIG. 7.

It is noted that in this system, the two LCDs 98, 99 see a different number of reflections in both the illumination path and the imaging path. While the direction of scrolling the color shutter would be reversed left to right for the second LCD 99, relative to the first LCD 98 in the illumination path, if horizontal scanning is used (in the plane of the paper), this reversal would be corrected in the imaging path. The left to right reversal of the images on the two panels with respect to each other can be corrected by known techniques. As can be seen in FIG. 7, this problem does not occur in a reflective LCD version. This simplifies system design because the images are not reversed with respect to each other.

EXAMPLE 5

Figure 9:
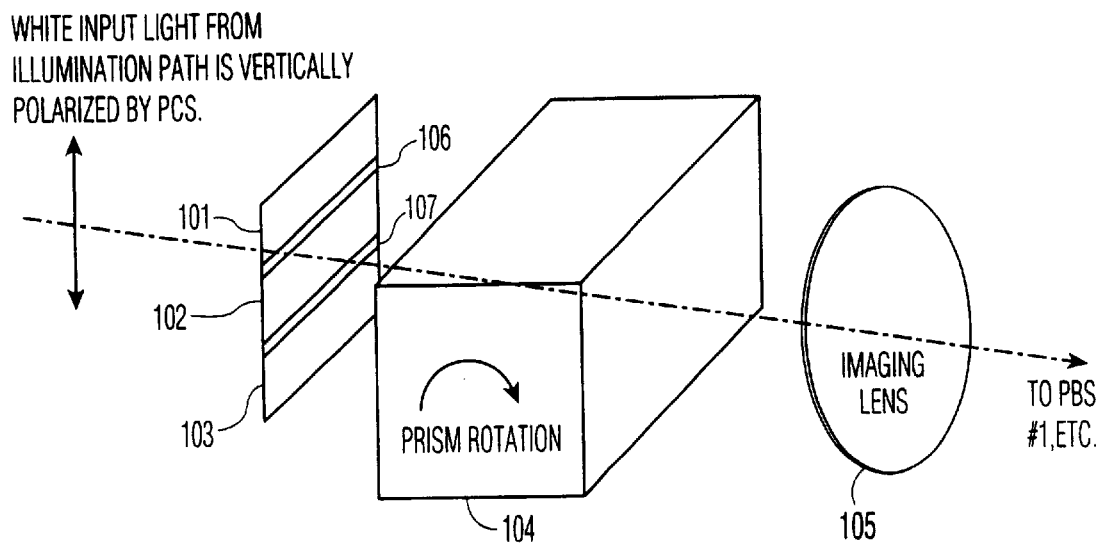
FIG. 9 shows a fixed retarder, mechanically scanned selectively polarizing filter system according to the present invention.

According to another embodiment of the invention, shown in FIG. 9, the E-SPF 82 of FIG. 7 is replaced with a system including passive SPFs 101, 102, 103 and a scanning prism 104.

In this case, each SPF (Shown as Red 101, Green 102 and Blue 103) acts as a one-half wave retarder in the design wavelength band, and therefore rotates the polarization of that color by 90 degrees. Outside of the design wavelength band, the retarder does not affect the polarization of the light. The three SPFs 101, 102, 103 taken together have approximately the same aspect ratio as the LCD 86, 89 devices, perhaps with some overfill. In order to provide blanking for refresh, an obstructive filter 106, 107 may be provided between retarders. The imaging lens 105 images the retarder set 101, 102, 103 through the rotating prism 104 and PBS elements 84, 85, 87, 88 onto the respective LCDs 86, 89. The rotating prism 104 scans the image so that each of the three sets of complementary color bands scans vertically on each LCD 86, 89. As in prior art scanning color projectors, when a portion of the image of the SPF drops off the bottom of the LCD, it immediately reappears at the top of the LCD. The first LCD 86 thus receives RGB scrolling color illumination, while the second LCD 89 receives CMY scrolling color illumination.

A particular advantage of this system over prior art scrolling color illumination is that the full etendue of the panel/projection lens combination is used, rather than one third of the etendue. Depending on the system etendue and the lamp used, this will increase lumen throughput by a factor of about 1.5× to 2.5×.

EXAMPLE 6

Figure 10:
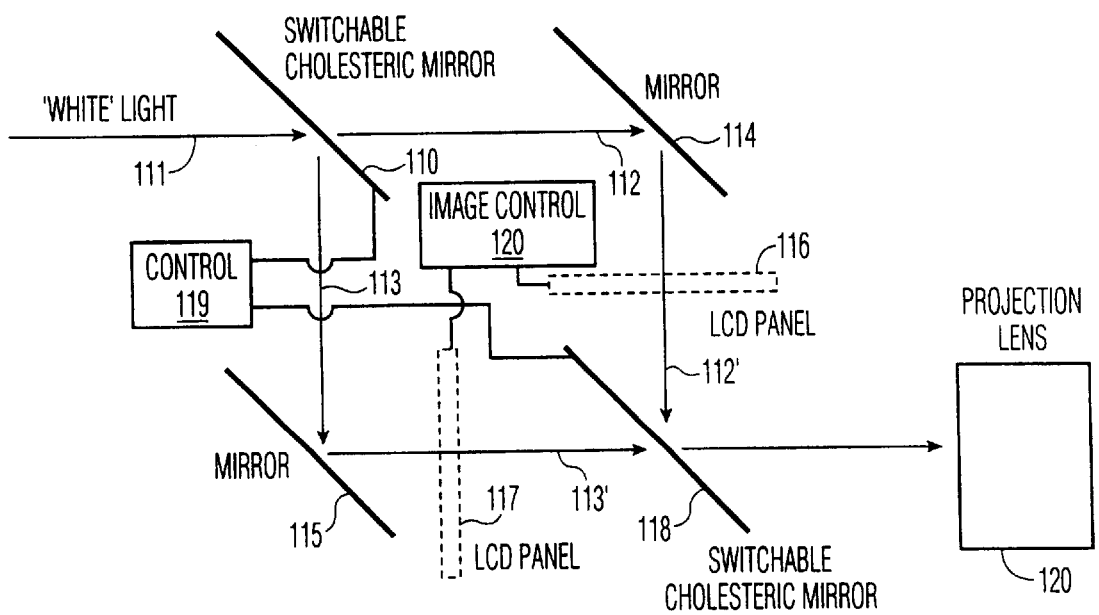
FIG. 10 shows an alternate embodiment of the present invention having selectively controllable switchable mirrors.

As shown in FIG. 10, a switchable cholesteric mirror 110, i.e., an electrically controlled liquid crystal variable retardance structure may be provided as a selectively reflective structure disposed along the white light path 111. The light in the white light path 111 is linearly polarized. The white light is split by the switchable cholesteric mirror 110 into two components, a first component 112 which is transmitted and a second component 113 which is reflected. A respective mirror 114, 115 is provided along the path of the first component 112 and second component 113, to redirect the split light. FIG. 10 shows a first 116 and second 117 transmission mode spatial light modulator, for example a matrix liquid crystal display module. The modulated light from the first 112' and second 113' components, respectively, are merged with a second switchable cholesteric mirror 118, and projected by projection lens 120.

Figure 11A:
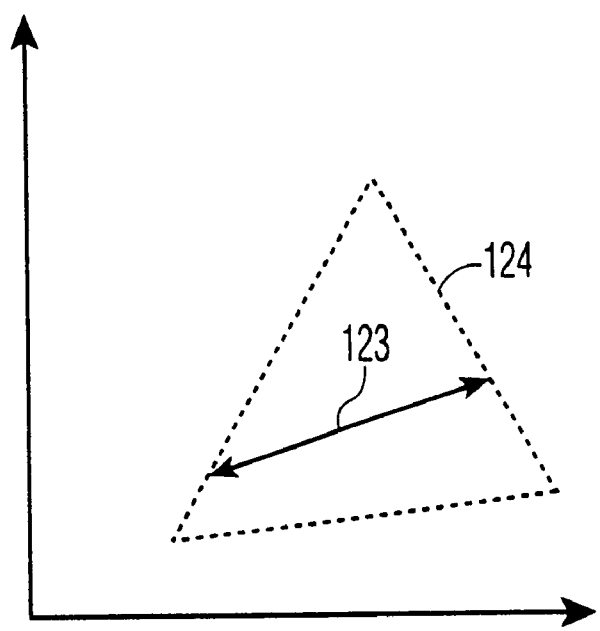
FIGS. 11A, 11B, 12A and 12B show, respectively first and second separations of white light plotted on the CIE 1931 color gamut and plotted as a function of wavelength, respectively, in the embodiment shown in FIG. 10.
Figure 11B:
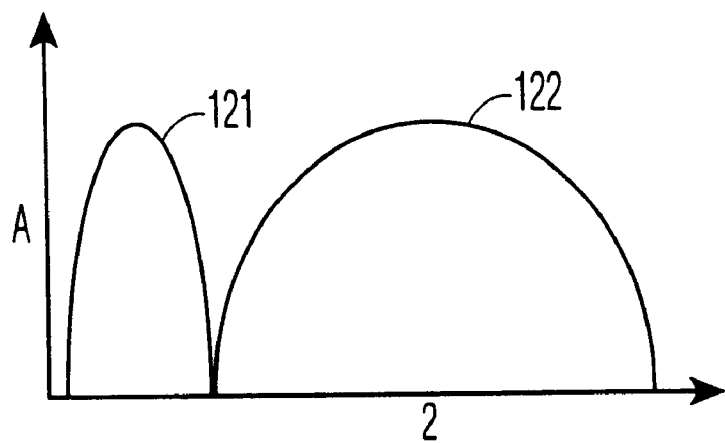
Figure 12A:
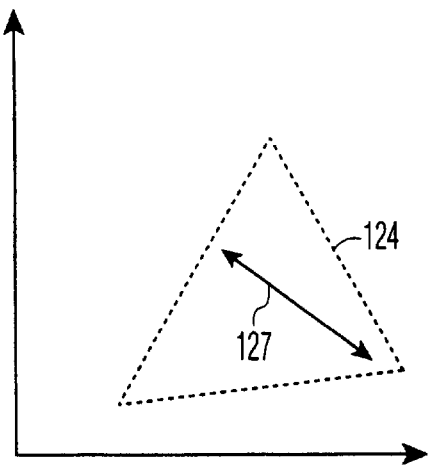
Figure 12B:
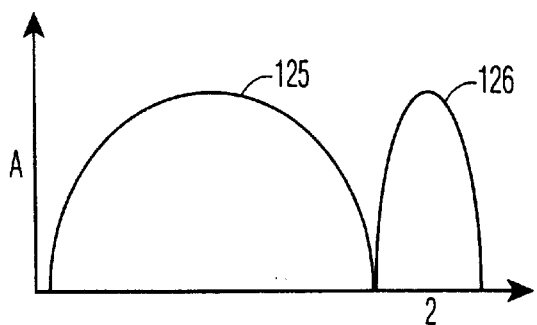

In a first embodiment, the set of switchable cholesteric mirrors 110, 118 are each driven in synchrony by control 119 and each have two optical states. In a first state, as shown in FIGS. 11A and 11B, the short wavelength components, e.g., blue 121, are separated from longer wavelength components, e.g., yellow 122. The available output in color gamut 124 in this case is represented as the line 123, which represents the combination of light modulated by first 116 and second 117 transmission mode spatial light modulators, under control of image control 120, in the first state of the switchable cholesteric mirrors 110, 118.

Figure 13:
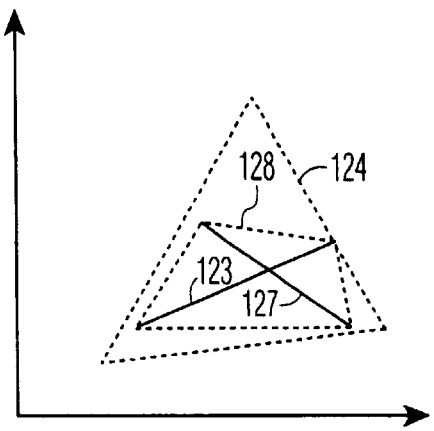
FIG. 13 shows the composite colors space available from the two respective color split conditions represented in FIGS. 11A, 11B, 12A and 12B.

In a second state, the first 112 and second 113 light components are, e.g., cyan 125 and red 126, respectively. The available output in color gamut 124 in this case is represented as the line 127, which represents the combination of light modulated by first 116 and second 117 transmission mode spatial light modulators, under control of image control 120 in this second state of the switchable cholesteric mirrors 110, 118. the two states of the switchable cholesteric mirrors 110, 118 alternate rapidly, and thus the sum of these two states are perceived by the human eye. FIG. 13 therefore shows that, with two states, the perceived output range 128 encompasses a substantial portion of the visible color gamut 124, and therefore this relatively simpler embodiment, which needs only a single switchable layer for each switchable cholesteric mirror 110, 118 may be acceptable for various applications.

It is noted that, in this embodiment, the split colors are not necessarily treated as primary and complementary by the image control 120, but rather the position of the desired output within the available color space is determined, and an appropriate linear combination of output from the two available axes presented.

If the switchable cholesteric mirrors 110, 118 are provided with an additional degree of freedom, i.e., the three or more state controllable E-SPF as discussed above, then a more complete color space (approximating the color gamut) is available, and the control strategy of the image control 120 may be as described with respect to Example 4. It is also noted that reflective mode spatial light modulators, such as described above with respect to Examples 1 or 2, or digital micromirror devices (DMDs), respectively embodying the mirror 114, 115 and spatial light modulator 116, 117 in a single structure, may also be provided.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. An imaging system, comprising:
   a broadband light source;
   a selective beamsplitter, adapted to spatially separate light within a controllably selected spectral band from light outside said controllably selected spectral band, the beamsplitter being electronically controllable to select said controllably selected spectral band by varying what range of wavelengths is included within said controllably selected spectral band; and
   a pair of light modulators, being respectively disposed along the path of light within said controllably selected spectral band and within said light outside said controllably selected spectral band.

2. The imaging system according to claim 1, wherein said broadband light source (81) comprises an unpolarized white light source having various polarization angles and a polarization converting system for converting said unpolarized white light into polarized white light having substantially a single polarization axis.

3. The imaging system according to claim 1, wherein said selective beamsplitter (82, 84) comprises a selective polarization converter (82), adapted for controllably rotating a polarization angle of a selected spectral band of light with respect to said light outside said controllably selected spectral band, and a polarizing beamsplitter, for spatially separating the selected wavelength band of light outside said controllably selected spectral band.

4. The imaging system according to claim 1, wherein said pair of light modulators (86, 89) each comprise an electro-optic spatial light modulator.

5. The imaging system according to claim 1, wherein said pair of light modulators (86, 89) each comprise an LCD imaging panel.

6. The imaging system according to claim 1, wherein said selective beamsplitter (82, 84) is electrically controllable (119) to rotate a polarization axis of a selected color band.

7. The imaging system according to claim 1, wherein said selective beamsplitter (82, 84) is based on cholesteric materials.

8. The imaging system according to claim 1, wherein said selective beamsplitter (82, 84) provides control over a spatial pattern of spectral band separation (72).

9. The imaging system according to claim 1, wherein said selective beamsplitter (82, 84) generates a scrolling scan of respectively differing spectral bands (101, 102, 103, 104, 105, 106, 107).

10. The imaging system according to claim 1, further comprising a beamsplitter (88) for recombining modulated light within said controllably selected spectral band and modulated light outside said controllably selected spectral band.

11. The imaging system according to claim 1, wherein said light modulator (86) disposed along a path of light within said controllably selected spectral band modulates red, green and blue light and said light modulator (89) disposed along a path of light outside said controllably selected spectral band modulates cyan, magenta and yellow light.

12. The imaging system according to claim 1, further comprising means (119) for varying the selected spectral band over time.

13. An imaging method, comprising:
   providing a broadband light source;
   electronically controlling a selective beamsplitter to controllably select a spectral band and to split the output of the broadband light source to selectively spatially separate light within the controllably selected spectral band from light outside the controllably selected spectral band; and
   separately spatially modulating light disposed along the path of light within the controllably selected spectral band and light outside the controllably selected spectral band.

14. The imaging method according to claim 13, wherein the selective beamsplitter controllably rotates a polarization angle of a selected spectral band of light with respect to said light outside said controllably selected spectral band, and spatially separates the selected wavelength band of light outside said controllably selected spectral band.

15. The imaging method according to claim 13, wherein the splitting step is controlled electrically to rotate a polarization axis of a selected color band.

16. The imaging method according to claim 13, wherein the splitting step is controlled mechanically.

17. The imaging method according to claim 13, wherein light disposed along a path of light within said controllably selected spectral band comprises red, green or blue light at any spatial location and light disposed along a path of light outside said controllably selected spectral band comprises cyan, magenta, or yellow light at any spatial location.

* * * * *